United States Patent Office 3,073,680
Patented Jan. 15, 1963

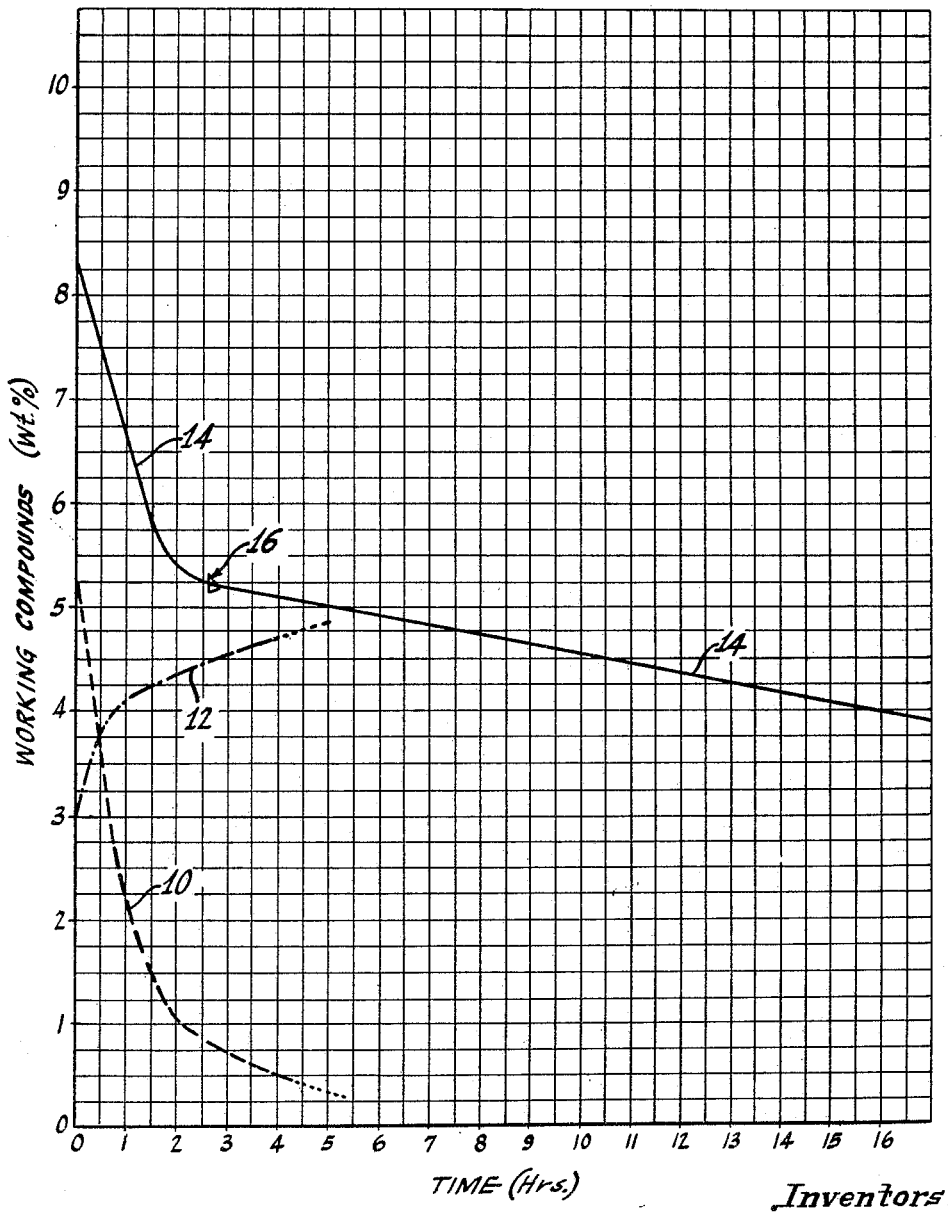

3,073,680
PRODUCTION OF HYDROGEN PEROXIDE
Theodore M. Jenney, Arlington, Mass., and Donald H. Porter, Tonawanda, N.Y., assignors to FMC Corporation, a corporation of Delaware
Filed Mar. 20, 1961, Ser. No. 96,876
2 Claims. (Cl. 23—207)

This invention relates to the production of hydrogen peroxide by the alternate reduction and oxidation of an anthraquinone working material, and more particularly to a continuous process wherein a nuclearly hydrogenated anthraquinone is employed as the working compound.

Heretofore, the anthraquinone process has been commercially practiced with alkylated anthraquinones, e.g., 2-ethyl anthraquinone, or mixtures of various alkylated anthraquinones. These compounds are dissolved in selected solvents, and the mixture or working solution is then subjected to alternate reduction and oxidation. Hydrogen peroxide is produced during the oxidation step and is separated from the remainder of the working solution. This process is fully described in United States Patent 2,657,980 issued to Sprauer on November 3, 1953.

These working compounds employed by prior workers have been found to be commercially desirable because of the relative ease of carrying out the hydrogenation and oxidation steps. However, they suffer the disadvantage of rapidly degrading to products which are incapable of being cyclically reduced and oxidized to produce $H_2O_2$. Increasing the temperature at which the reduction or oxidation occurs further accelerates this side reaction, with the production of increased amounts of degradation products. Additionally, if the proportion of working compound which is hydrogenated per pass through the system (also termed "depth of hydrogenation") is increased, the amount of degradation rises sharply.

These conventional anthraquinone working compounds also undergo some nuclear attack during the catalytic hydrogenation step. This results in the gradual formation of tetrahydro anthraquinone derivatives. These compounds, unlike the degradation products reviewed above, will produce $H_2O_2$ upon cyclic reduction and oxidation. Moreover, the inclination to form unknown degradation products which cannot be reduced and oxidized to form $H_2O_2$ appears to be greater with the alkylated anthraquinones than with their tetrahydro derivatives.

In spite of this, the art has not favored the conversion of the anthraquinone working compounds to their tetrahydro derivatives, or the use of these derivatives as working compounds, because of the difficulty encountered in commercially reducing and oxidizing tetrahydroanthraquinones to form hydrogen peroxide. This is clearly disclosed in United States Patent 2,739,042 issued to A. E. Corey et al. on March 20, 1956. In an effort to avoid working with the tetrahydro derivative, the patentees recite a method of regenerating anthraquinones from their corresponding tetrahydro derivatives. This is done by heating the tetrahydroanthraquinone-containing solution in the presence of a dehydrogenation catalyst to convert the tetrahydroanthraquinone to its precursor anthraquinone. This technique is designed to minimize the amount of tetrahydroanthraquinone formed in the cyclic process by including special processing steps for treating the work solution during cyclic operation.

Another procedure for reducing the formation of tetrahydro derivatives is taught in United States Patent 2,673,140. This is done by conducting the catalytic hydrogenation under very limited pressures, and by keeping the amount of hydrogenation (depth of hydrogenation) to very restricted amounts.

It is an object of this invention to produce hydrogen peroxide by the anthraquinone process, employing as the working compound an anthraquinone derivative which is substantially stable, and which resists being converted into derivatives that cannot produce hydrogen peroxide upon oxidation.

It is a further object of the invention to produce hydrogen peroxide by the anthraquinone process wherein the amount of hydrogen peroxide produced remains substantially constant per pass of working mixture through the equipment.

It is a further object of the invention to produce hydrogen peroxide by the anthraquinone process in which a working compound is employed which has improved stability against the formation of degradation products at high temperatures and under increased depths of hydrogenation.

These and other objects will be apparent from the following disclosure.

It has now been determined, quite unexpectedly, that a continuous process for producing hydrogen peroxide, by alternate reduction and oxidation of a tetrahydro derivative of an anthraquinone, can be carried out efficiently and economically provided that the tetrahydro derivative is present in amounts greater than about 85% of the working compound; that it is hydrogenated to a depth of 55 to 80%; that that it is contacted by air passed into the working solution through diffusers having pore diameters from about 0.006 to 0.015 inch at a flow rate of about 2 to about 4 c.f.m. per square foot of oxidizing tower cross-sectional area, and for a minimum contact time of about 15 seconds.

In the present process the working solution contains the tetrahydro derivative of an anthraquinone in the amount of at least about 85% of the working compound or compounds present. This proportion of tetrahydro derivative is required in order to obtain the full benefit of its increased stability. This is illustrated by the figure from data obtained in Example 1, hereinafter described.

In the FIGURE, curve 10 represents the concentration of ethyl anthraquinone (expresed as wt. percent) in the work solution during the test. Curve 12 similarly represents the concentration of ethyl tetrahydro anthraquinone in the work solution. As will be observed during the course of this test, curve 10 decreases in value, while curve 12 increases. This is due to the conversion of the ethyl anthraquinone to ethyl tetrahydro anthraquinone in the work solution, until virtually no ethyl anthraquinone remains. Curve 14 represents the total amount of usable anthraquinones capable of producing hydrogen peroxide, including both the ethyl anthraquinone and the ethyl tetrahydro anthraquinone forms thereof, which are present in the work solution. In effect, curve 14 gives the additive numerical values of curves 12 and 14. The slope of curve 14 at any point illustrates the rate at which degradation of the working mixture proceeds, since is shows the amount of usable anthraquinone content at the start of the run and also the amount which remains at any point throughout the test period. Point 16, on curve 14, is the point where the ratio of ethyl tetrahydro anthraquinone to ethyl anthraquinone reaches about 85% by weight of the total anthraquinone present. The sharp change in the slope of curve 14, at point 16, clearly shows the striking change in degradation rate of the working mixture, when it contains ethyl tetrahydro anthraquinone in amounts over about 85% by weight.

Anthraquinones which may be converted to their tetrahydro derivatives and utilized in the process of the present invention include 2-ethyl, 2-isopropyl-, 2-sec-butyl, 2,5-butyl, 2-sec amyl, 1,3-dimethyl-, 2-tertiary alcohol, the 2-methyl derivative, and others well known in the hydrogen peroxide art.

The working solution containing the tetrahydro form of the working compound is subject to reduction in a hydrogenation zone in the presence of a catalyst. The catalyst employed is most suitably a noble metal catalyst, such as palladium deposited on an inert carrier. The carrier may comprise alumina, carbon, silica, silica alumina, calcium aluminum silicate, carbonates and others. Reduction of the tetrahydro derivative takes place in a "fixed bed" chamber. In this type of catalytic hydrogenator, the catalyst is supported at the base of the hydrogenator on a perforated holder, and working solution is passed into the top of the hydrogenator concurrently with excess hydrogen. This mixture is reduced by mere contact with hydrogen in the presence of the catalyst, as it flows through the fixed bed. The proportion of working compound which is hydrogenated per pass (depth of hydrogenation) is at least about 55 to 80%. If higher depths of hydrogenation are desired, i.e. up to 90%, they may be carried out readily, but with some increase in the formation of degradation products. However, even if the instant process is operated to yield a 90% depth of hydrogenation, the build-up of degradation products is no greater than that obtained with conventional anthraquinones when operated to yield 50% depth of hydrogenation.

The working solution, after leaving the catalytic hydrogenator, is passed into an oxidizer. In the oxidizer, the working solution is oxidized by contacting the solution with air. In the normal mode of operation, the working solution flows continuously into the base of the oxidizing tank and is removed as oxidized overflow through a standpipe at the top of the oxidizing vessel. Air is pumped into diffusers located at the base of the oxidizing vessel and is released through the diffuser openings as a continuous upward flow of dispersed bubbles passing through the working solution.

The oxidation of the tetrahydroanthrahydroquinones is more difficult than corresponding hydroanthraquinones and requires the hereinafter described operating conditions to carry out the oxidation on a commercial scale. The conditions under which oxidation takes place are critical since the amount of oxidation which occurs is governed by the amount of oxygen mass transfer between the liquid phase (working solution) and the gaseous, or air phase. It has been found that the working solution should be passed through the oxidizer at rates not lower than of about 400 to 600 liters per hour per foot$^2$ of tower cross-section in order to obtain maximum mass transfer. Flow rates below this amount result in substantially diminishing the mass transfer rate. Flow rates above this amount do not materially increase the rate of mass transfer per unit quantity of solution (mass transfer coefficient).

The rate of flow of air into the oxidizer also must be controlled carefully in order to obtain optimum oxidation of the working solution. The volume of air flowing through the oxidizer, which is generally at atmospheric pressure, although either subatmospheric or super atmospheric pressures may be employed, is maintained at between about 2 to about 4 c.f.m./ft.$^2$; that is, the volume of air passing through the column, regardless of the pressure within the tower, must measure between about 2 to about 4 c.f.m./ft.$^2$ of oxidizing tower.

Contrary to what might be expected, supplying copious quantities of air into the oxidizer does not provide high mass transfer rates. When the flow of air into the oxidizing tower is maintained between 2 to 4 c.f.m./ft.$^2$ of oxidizing tower, the mass transfer coefficient (oxidation rate) becomes desirably high. When flow rates of air above this range are employed, an unexpected sharp decrease occurs in both the mass transfer coefficient and in the volume of liquid contained in the oxidizing vessel. The sudden decrease in the liquid volume of the oxidizer, when a given air throughput is reached, is termed the liquid holdup break-point. Air flow rates above this point can never give high mass transfer rates because of the great decrease in volume of working solution present in the oxidizer.

When the rate of flow of air into the oxidizer is employed at below 2 c.f.m./ft.$^2$ of oxidizing tower, the mass transfer coefficient again drops off quite considerably. As a result, oxidation of the working solution is incomplete and requires additional passes through the oxidizer to complete the oxidation.

The size of the air bubbles which are released by the diffusers and which contact the working solution must also be subject to careful control. If extremely fine air bubbles, i.e. those obtained by employing diffusers having an average pore diameter below 0.005", are employed, small mass transfer coefficients are obtained. The finer air bubbles which are released by the smaller diameter diffusers appear to create an extremely stable foam in the oxidizing vessel. As a result, there is very little effective agitation and, consequently, a serious diminishing of mass transfer coefficient.

Additionally, the finer air bubbles cause the liquid holdup break-point in the oxidizing unit to be reached sooner; that is, the liquid holdup break-point is reached at a lower air flow than with coarser-sized air bubbles. Accordingly, the maximum air flow rate of finer air bubbles which can be passed through the oxidizer before reaching the liquid holdup break-point is low. This prevents greater volumes of air from effectively contacting the working solution.

It has been found that diffusers having an average pore diameter of from 0.006 to 0.015" deliver air bubbles which give maximum mass transfer coefficients at air flows between 2 c.f.m. to 4 c.f.m./ft.$^2$ of oxidizing tower cross-section. An optimum pore diameter is between 0.008 to 0.011". If diffusers having an average pore diameter above these values are employed, incomplete oxidation occurs and lowering of the mass transfer coefficient results.

In order to obtain sufficient duration of contact between the air phase and the working solution, or liquid phase, it has been determined that the height of a single-stage oxidizing tower should be at least about 100 inches tall. This height permits a contact time of at least about 15 seconds. Single-stage oxidation towers below this height do not allow sufficient time for the working solution and air phase to react completely. This results in erratic oxidation and inefficient oxidation, along with decreased hydrogen peroxide production. Multi-stage oxidation towers may be employed, provided that they permit the air phase to contact the working solution for a minimum total contact time of 15 seconds.

After the working solution is removed from the oxidizer, it is subjected to a water wash which dissolves the hydrogen peroxide in the aqueous phase. This aqueous phase containing the hydrogen peroxide is then separated from the residual working solution and sent to purifying units. The residual working solution is then recycled to the catalytic hydrogenator.

The instant process, because of its extremely stable working compound, i.e. tetrahydroquinones, has many advantages over the prior working compounds. Among these is the ability to operate at higher temperatures without deleterious side effects. By increasing the temperature of operation, greater quantities of working compound can be dissolved in the working solution. As a consequence, more hydrogen peroxide is obtained per pass through the system.

Another advantage resides in the virtual elimination of quinone regeneration steps or, alternatively, in steps for removal of degraded by-products. The tetrahydro derivatives employed as the working compounds have such increased stability compared to their precursor anthraquinones that the amount of degraded by-products is materially reduced. As a result additional process steps are not required for removing these by-products.

Another advantage resides in the high concentration of peroxide which is formed in the working solution. This may be attributed either to the increased temperatures of operation or to the increased depth of hydrogenation of the working solution. That is, more working compound is alternately reduced and oxidized per pass through the system due to an increased depth of hydrogenation, or alternately by dissolving more working compound in the working solution at the higher operating temperatures. The increased quantity of working compound passed through the system produces more hydrogen peroxide per unit of working solution. This results in an increase in peroxide concentration in the work solution. Upon aqueous extraction of the work solution, the increased amounts of peroxide are absorbed in the aqueous phase resulting in an aqueous extract having a higher concentration of peroxide.

Increased peroxide concentration in the aqueous extract is extremely desirable. It is advantageous because higher concentrations of peroxide in the aqueous phase permit more efficient extraction. Furthermore, it reduces the amount of distillation required to purify the hydrogen peroxide product. As a result, the distillation step can be simplified and the time required for distillation can be reduced.

The following examples are given to illustrate the invention but are not to be considered as being limitative of it.

EXAMPLE 1

The following run was made under total recycle conditions in the hydrogenator as described below in order to compare the degradation rate of 2-ethyl anthraquinone and 2-ethyl tetrahydroanthraquinone. This recycle test accelerates reaction conditions in the hydrogenator, and can be used to determine rapidly the rate at which working compounds will be converted into unuseable anthraquinone derivatives by the catalyst.

A fixed bed hydrogenator was charged with a catalyst comprising 1.0% palladium on an activated alumina carrier, and having a particle size of 10–20 mesh. A total of 2.5 liters of a work soluion comprising 61 wt. percent dimethylnaphthalene as the quinone solvent and 39 wt. percent trioctylphosphate as the hydroquinone solvent was passed downwardly through the hydrogenator with excess hydrogen at a pressure of 35 p.s.i.a. and at a temperature of 50° C. The original solution contained an anthraquinone composition indicated in Table I. The working solution which passed through the hydrogenator was recycled to the top of the hydrogenator along with more hydrogen, in a continuous cycle. Periodic analyses of the working solution were made to determine the useable anthraquinone composition, and these results are reported in Table I.

Table I

| Time (Hrs.) | Useable Anthraquinone Composition (Wt. Percent) | | |
|---|---|---|---|
| | Total | 2-Ethyl Anthraquinone | 2-Ethyl Tetrahydro-Anthraquinone |
| 0 | 8.4 | 5.4 | 3.0 |
| 0.25 | 8.0 | 4.8 | 3.2 |
| 0.50 | 7.7 | 4.0 | 3.7 |
| 1 | 6.3 | 2.2 | 4.1 |
| 2 | 5.3 | 1.0 | 4.3 |
| 4 | 5.2 | 0.5 | 4.7 |
| 7 | 4.7 | | 4.7 |
| 11 | 4.4 | | 4.4 |
| 15 | 4.2 | | 4.2 |
| 17 | 3.9 | | 3.9 |

EXAMPLE 2

The following runs were made to compare the rate of degradation of 2-ethyl tetrahydroanthraquinone with its precursor non-nuclear hydrogenated compound, 2-ethyl anthraquinone, using the process of the present invention.

In these tests the fixed bed hydrogenator was charged with a catalyst comprising 0.3% palladium on an activated alumina carrier, and having a particle size of 8–14 mesh. A total of 3000 liters of working solution were used in each of the runs. The solvent used in the working solution comprised 61 wt. percent dimethylnapthalene as the quinone solvent and 39 wt. percent trioctylphosphate as the hydroquinone solvent and contained the same amount of working compounds in each of the runs. The composition of the working compound is given in Table II.

The working solution, which is composed of the working compounds dissolved in the working solvents, was passed downwardly through the fixed bed, along with excess hydrogen, at a temperature of 40° C. The rate at which the working solution passed through the hydrogenation, as well as the depth of hyrogenation, is given in Table II. Of this total flow, a fraction was recycled directly to the top of the catalytic chamber, while the remainder was passed on as "forward flow" to the oxidizing tower. The rates of recycle and forward flow are given in Table II. The working solution was maintained in the oxidizing tower at the heights listed in Table II, and at temperatures between 40°–50° C. The oxidizing tower, which has a cross-section area of 1.33 feet, had 0.008-inch pore diameter candles at the base of the tower for the admission of air into the working solution. Air was pumped into the base of the oxidizer at the rates lisited in Table II and passed upward through the solution where it oxidized the hydrogenated working compounds. In each of the runs the amount of catalyst was adjusted so that 100 gm. moles/hour of hydrogen peroxide were obtained, and a direct comparison of the degradation rates could be made. The resulting degradation rates are given in Table II. Also listed in Table II is the amount of residual hydroquinone compound which was not oxidized in the tower.

Table II

| Runs | 1 | 2 | 3 | 4 | 5 |
|---|---|---|---|---|---|
| Solution Composition, gm. Moles/Liter: | | | | | |
| 2-Ethyl Anthraquinone | 0.45 | 0.45 | 0.05 | 0.05 | 0.05 |
| 2-Ethyl Tetrahydroanthraquinone | 0.05 | 0.05 | 0.45 | 0.45 | 0.45 |
| Total Flow in Hydrogenator, Liters/Hr | 11,000 | 7,337 | 11,000 | 7,337 | 6,116 |
| Recycle Flow to Hydrogenator, Liters/Hr | 10,000 | 6,670 | 10,000 | 6,670 | 5,560 |
| Forward Flow to Oxidizer, Liters/Hour Ft.² | 750 | 500 | 750 | 500 | 416 |
| Temperature of Hydrogenation, °C | 40 | 40 | 40 | 40 | 40 |
| Depth of Hydrogenation, Percent | 50 | 75 | 50 | 75 | 90 |
| Air Flow Rate in Oxidizer, c.f.m | 3 | 3 | 3 | 3 | 3 |
| Air Efficiency, Percent | 80 | 80 | 80 | 80 | 80 |
| Height of Working Solution in Oxidizer, Ft | 26.5 | 23.8 | 29.1 | 26.5 | 26.5 |
| $H_2O_2$ Produced, gm. Moles/Hour | 100 | 100 | 100 | 100 | 100 |
| $H_2O_2$ Concentration, gm. Moles/Liter | 0.25 | 0.375 | 0.25 | 0.375 | 0.450 |
| Outlet Unoxidized Working Compounds, gm. Moles/Liter | <0.0025 | <0.0025 | <0.0025 | <0.0025 | <0.0025 |
| Loss of Working Compound, gm. Moles/Hour | 0.46 | 0.92 | 0.10 | 0.20 | 0.50 |

EXAMPLE 3

A fixed bed hydrogenator was charged with 160 liters of a catalyst comprising 0.3% palladium on an alumina carrier, and having a particle size of 8–14 mesh. A total of 3000 liters of work solution was employed in this run. The solvent used in the working solution comprised 61 wt. percent dimethylnaphthalene as the quinone solvent and 39 wt. percent trioctylphosphate as the hydroquinone solvent and contained working compounds in the proportions listed in Table III.

The working solution, which is composed of the working compounds dissolved in the working solvents, was passed downward through the fixed bed along with excess hydrogen at the temperature listed in Table III. The rate at which the working solution passes through the hydrogenator, as well as the depth of hydrogenation, is given in Table III. Of this total flow, a fraction was recycled directly to the top of the catalytic chamber, while the remainder was passed on as "forward flow" to the oxidizing tower. These rates of recycle and "forward flow" are listed in Table III.

Multi-stage oxidizing towers were employed, each of which had a cross-section of 1.0 ft.² They had 0.008-inch pore diameter candles at the base of the tower for the admission of air into the working solution. Air was pumped into the base of the oxidizers at the rates listed in Table III, and passed upwardly through the solution where it oxidized the hydrogenated working compounds. The amounts of hydrogen peroxide produced are listed in Table III. The degradation rates of the working compounds are listed in Table III, along with the amount of residual hydroquinone compound which was not oxidized in the towers.

These runs were continued for a total of 39 days, during which periodic analyses of the working compound were made. The changes found in the content of working compounds are listed in Table III.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

Table III

| Days of Operation | 10 | 10 | 9 | 10 |
|---|---|---|---|---|
| Solution Composition, Wt. Percent: | | | | |
| 2-Ethyl Anthraquinone | 9.0 | 5.7 | 0.7 | 0.3 |
| 2-Ethyl Tetrahydroanthraquinone | 1.5 | 5.0 | 8.9 | 8.3 |
| Total Flow in Hydrogenator, Liters/Hour | 5,400 | 5,400 | 4,400 | 5,400 |
| Recycle Flow to Hydrogenator, Liters/Hour | 5,000 | 5,000 | 4,000 | 5,000 |
| Forward Flow to Oxidizer, Liters/Hour | 400 | 400 | 400 | 400 |
| Temperature of Hydrogenation, °C | 40 | 40 | 45 | 40–45 |
| Depth of Hydrogenation, Percent | 55 | 56 | 58 | 58 |
| Temperature of Oxidation, °C | 45 | 44 | 46 | 44 |
| Air Flow Rate in Oxidizer, c.f.m | 4 | 4 | 4 | 4 |
| Air Efficiency, Percent | 80 | 80 | 80 | 80 |
| Total Height of Working Solution in Oxidizers, Ft | 30.6 | 30.6 | 30.6 | 30.6 |
| $H_2O_2$ Produced, gm. Moles/Hour | 81 | 84 | 73 | 69 |
| $H_2O_2$ Concentration, gm. Moles/Liter | 0.237 | 0.247 | 0.228 | 0.203 |
| Outlet Unoxidized Working Compounds, gm. Moles/Liter | <.005 | <.013 | <.016 | <.009 |
| Loss of Working Compound in Moles per 1,000 moles of $H_2O_2$ produced | 0.02 | 0.02 | 0.01 | Nil |

What is claimed is:

1. In the continuous method of producing hydrogen peroxide by alternate reduction and oxidation of a liquid working solution containing an alkylated anthraquinone working compound, the improvement which comprises employing a tetrahydro derivative of an alkylated anthraquinone in said working compound in an amount greater than about 85% by weight of said total working compound, passing said working compound into a catalytic hydrogenator, hydrogenating said working compound to at least 55 to 75% of its total capacity, passing said working compound into an oxidizing zone, contacting said working compound with air passed into the solution from diffusers having pore diameters from about 0.006 to 0.015 inch at a flow rate of from 2 to 4 c.f.m./ft.² of cross-section of the oxidizing zone, said air and working compound having a minimum contact time of about 15 seconds, separating the hydrogen peroxide produced during the oxidation step from said working compound, recycling the working compound for additional processing to the catalytic hydrogenator, and recovering the hydrogen peroxide so produced.

2. Process of claim 1 wherein the working compound is 2-ethyl tetrahydroanthraquinone.

References Cited in the file of this patent

UNITED STATES PATENTS

| 2,158,525 | Ried et al. | May 16, 1939 |
| 2,886,416 | Cox et al. | May 12, 1959 |
| 2,966,398 | Jenney | Dec. 27, 1960 |
| 2,995,424 | Farrell | Aug. 8, 1961 |